March 3, 1936.   A. WARMISHAM   2,032,676
VIEWING DEVICE
Filed June 17, 1931   9 Sheets-Sheet 1

Inventor:
Arthur Warmisham,
By Miehle & Miehle
Atty's

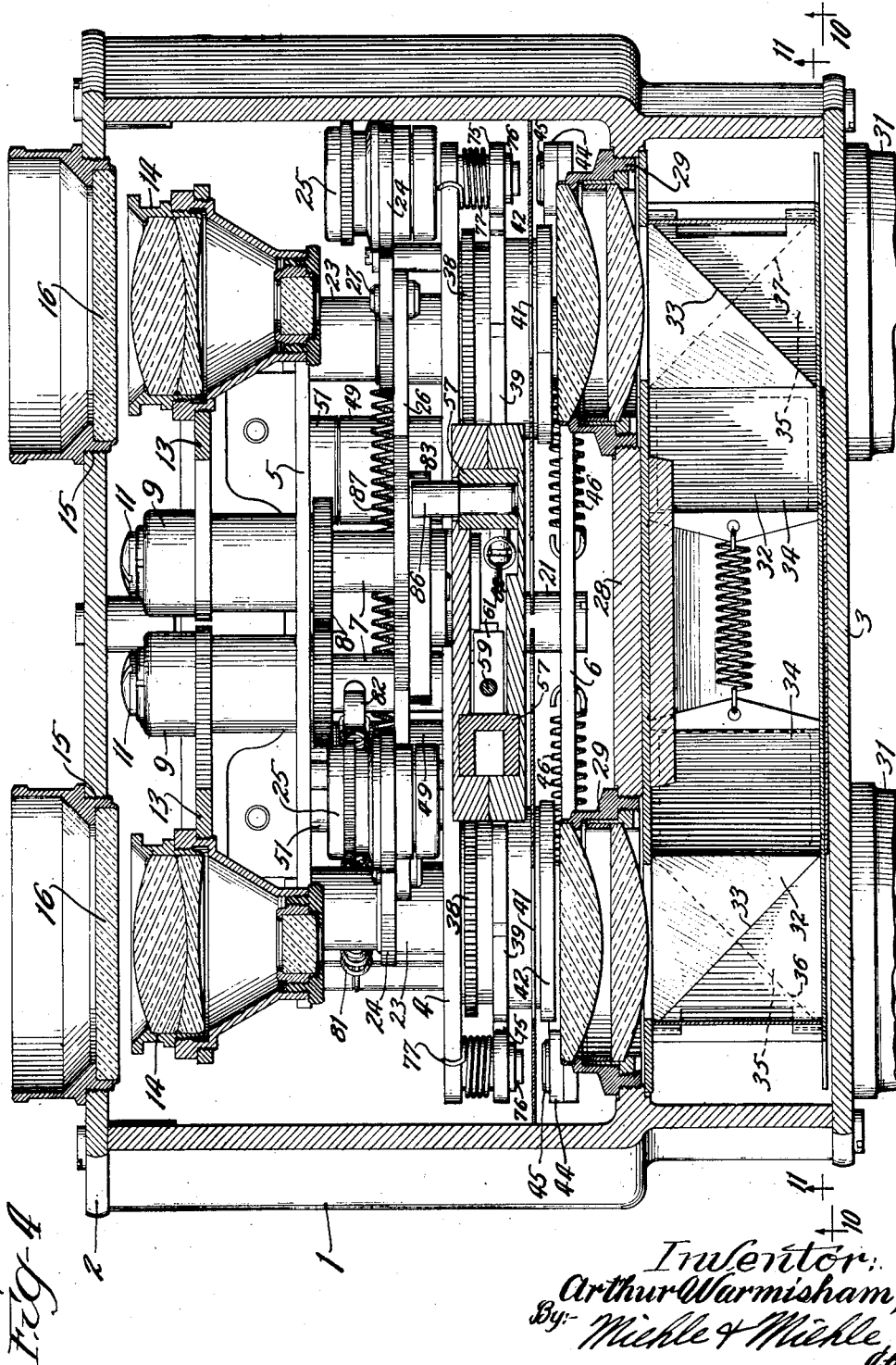

March 3, 1936.   A. WARMISHAM   2,032,676
VIEWING DEVICE
Filed June 17, 1931   9 Sheets-Sheet 3
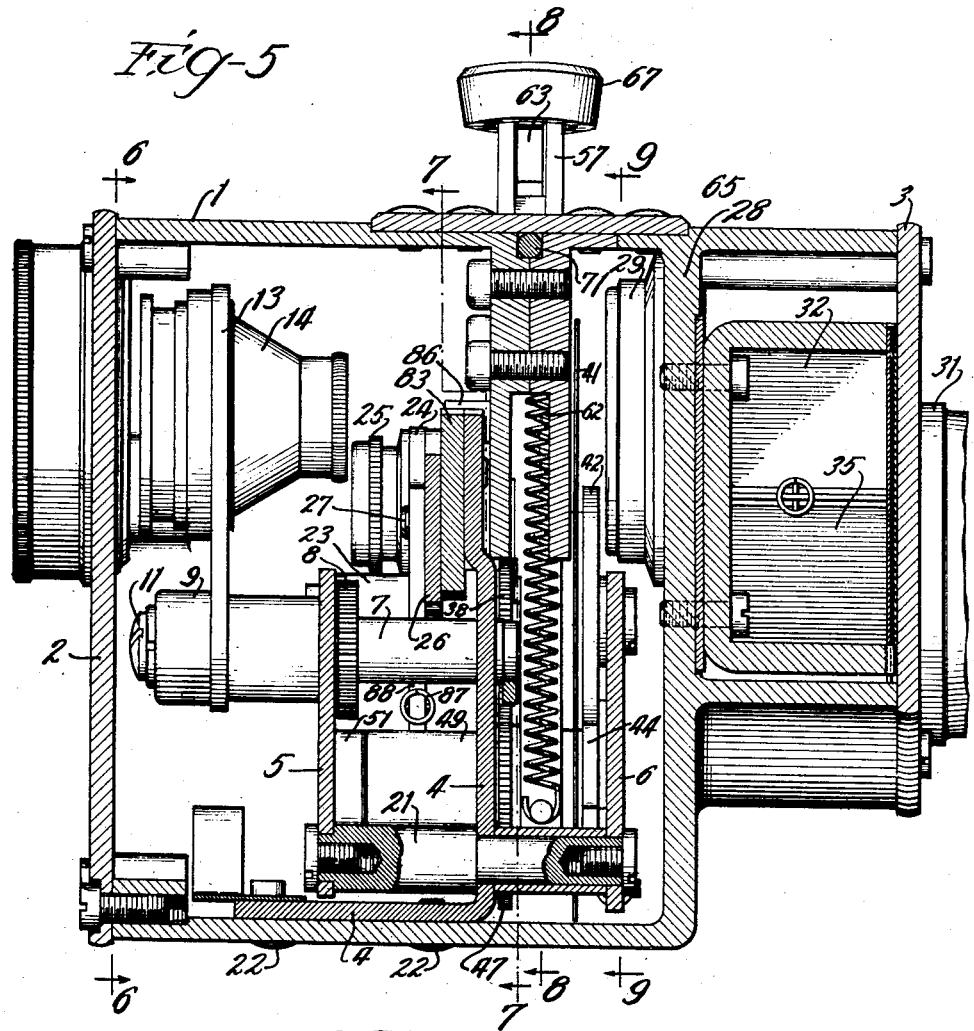
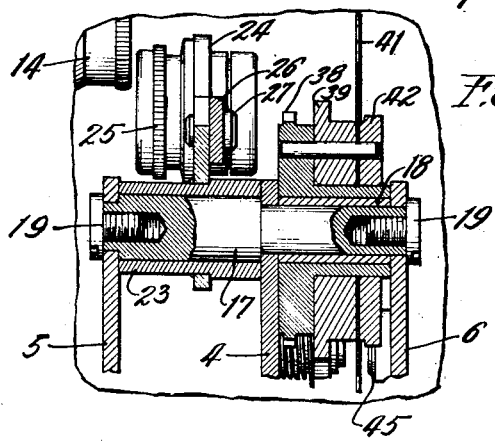
Inventor:-
Arthur Warmisham,
By:- Michl & Michl
Atty's March 3, 1936.　　　A. WARMISHAM　　　2,032,676
VIEWING DEVICE
Filed June 17, 1931　　　9 Sheets-Sheet 4
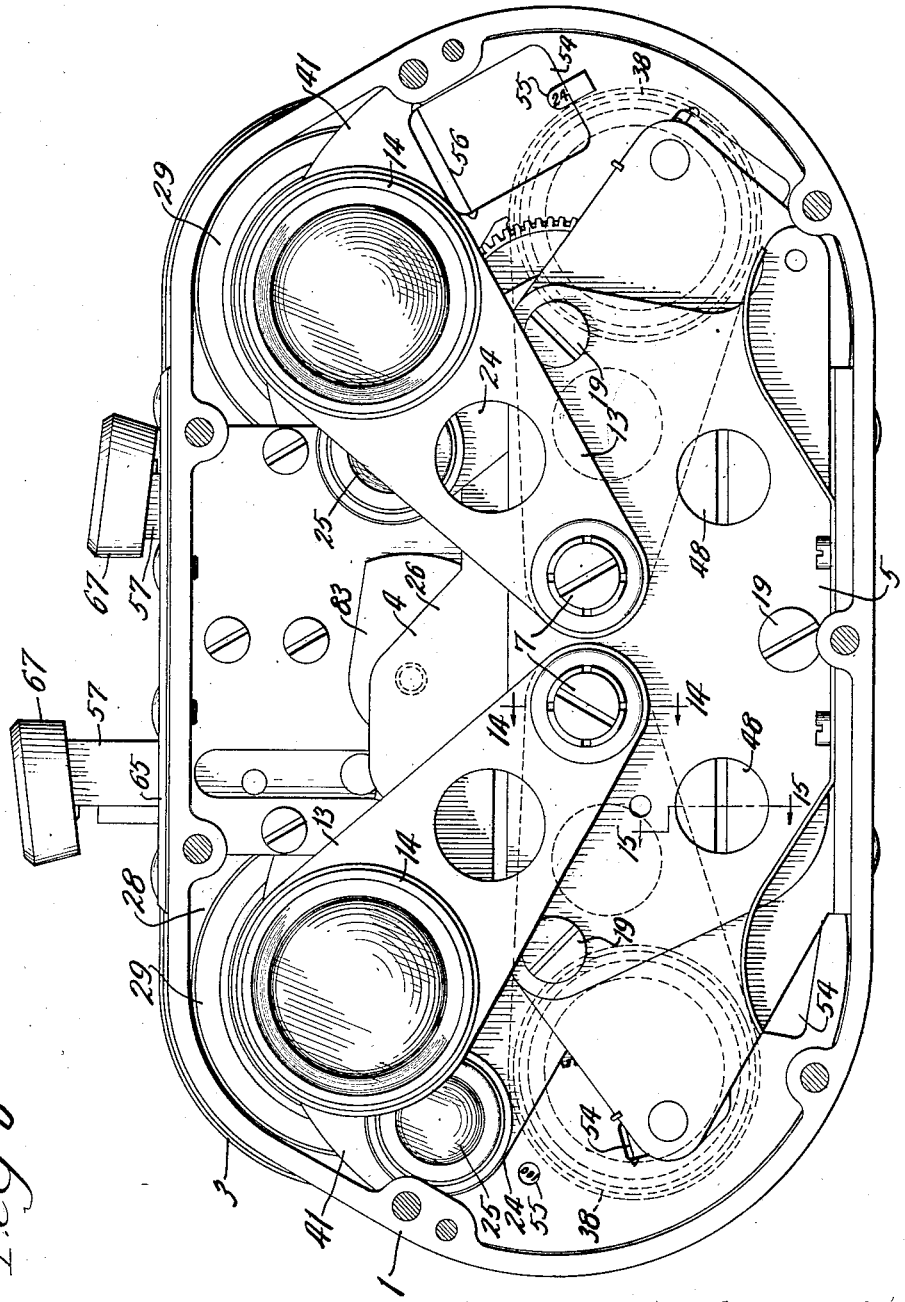
Inventor:
Arthur Warmisham,
By: Miehle & Miehle,
Attys

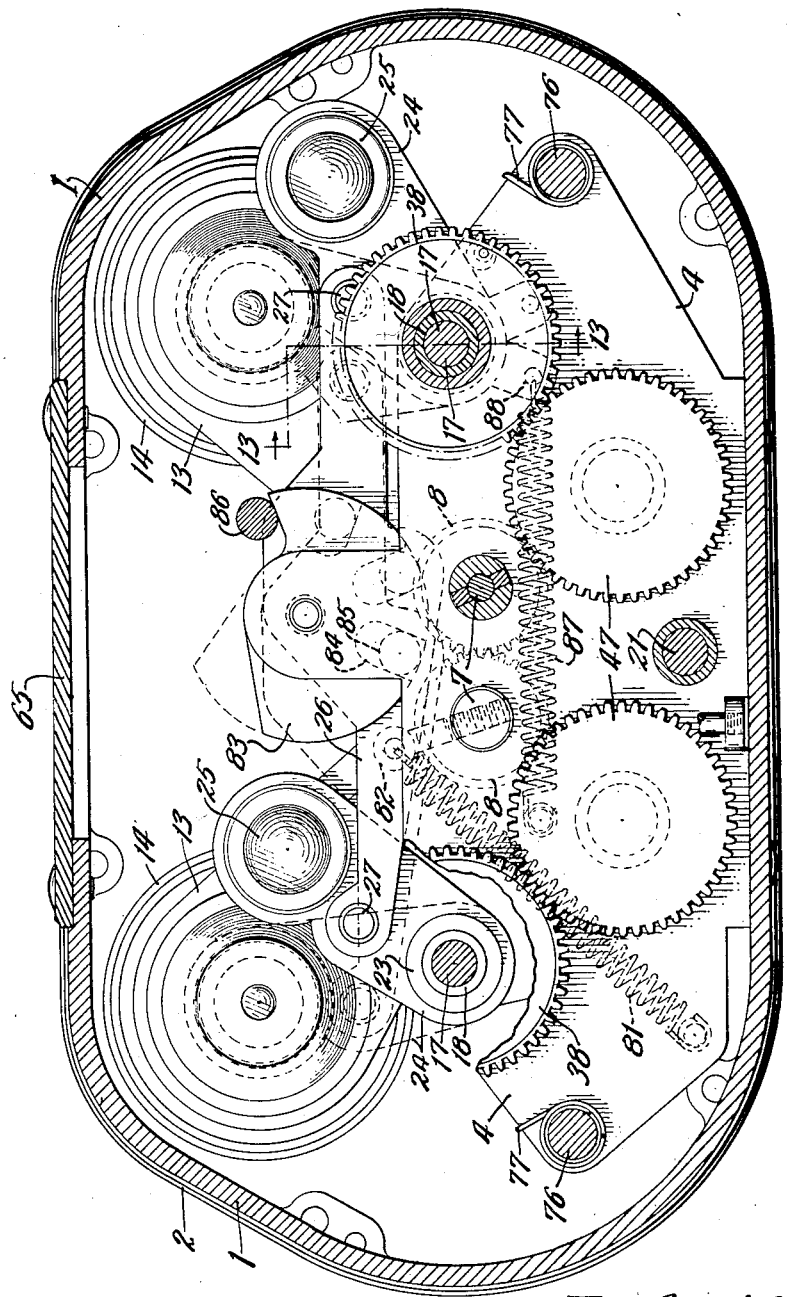

March 3, 1936.   A. WARMISHAM   2,032,676
VIEWING DEVICE
Filed June 17, 1931   9 Sheets-Sheet 6

Inventor:
Arthur Warmisham
By Michle & Michle
Att'ys

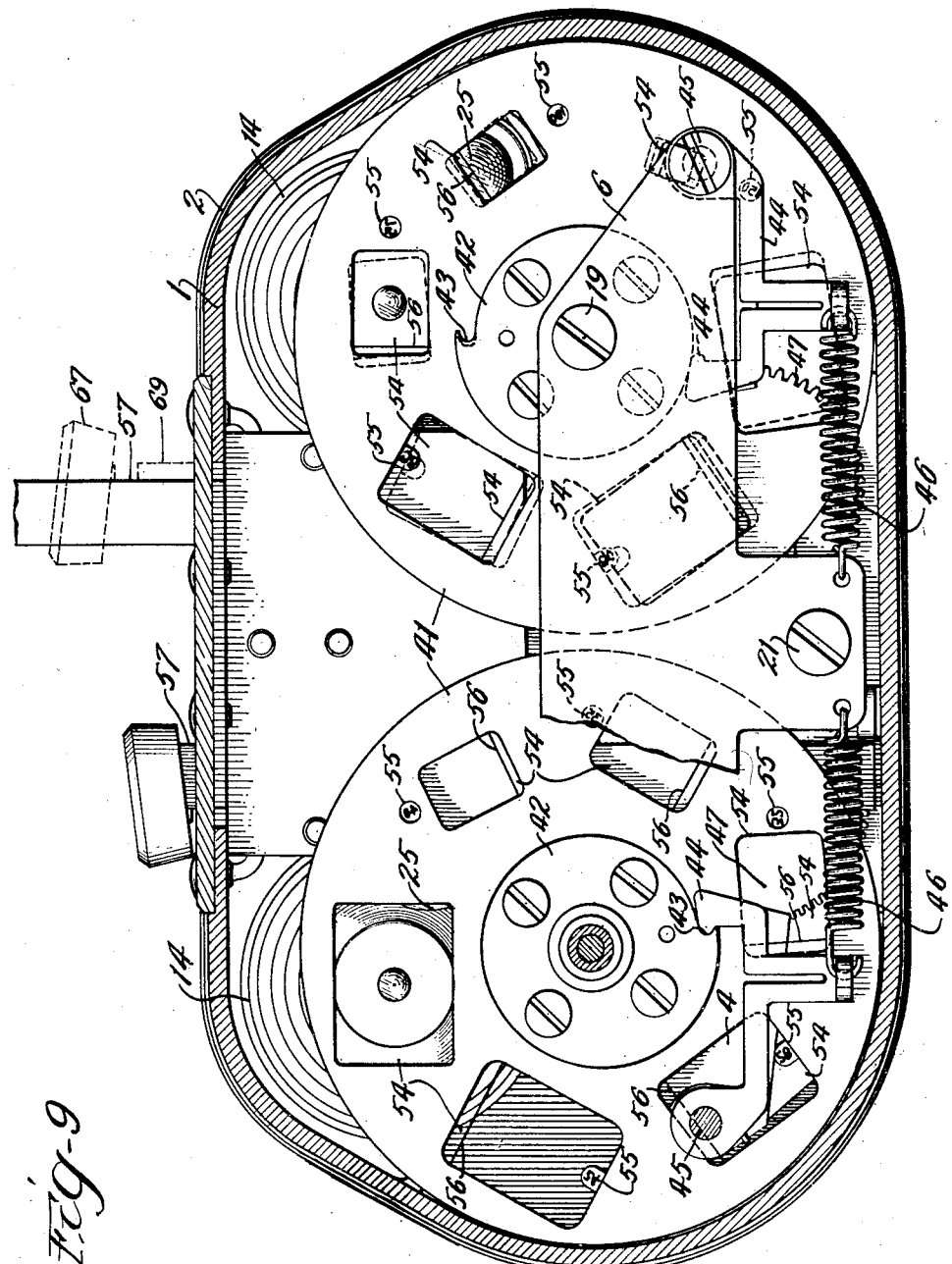

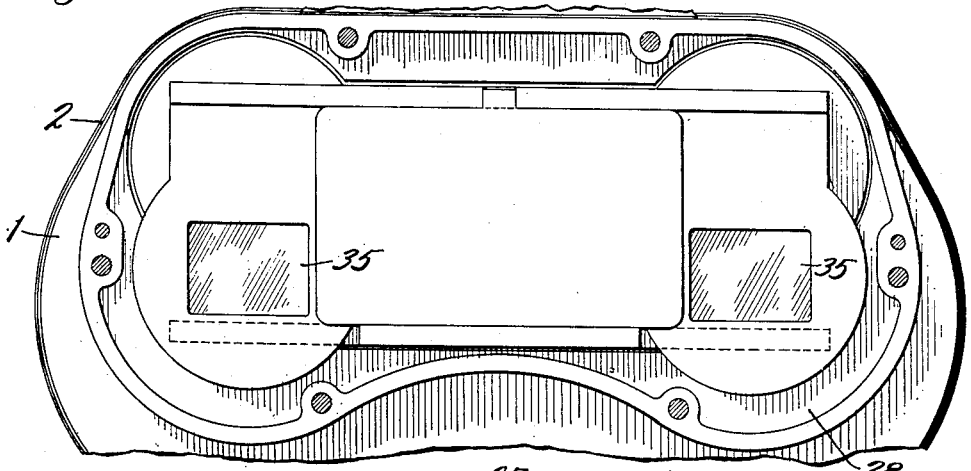
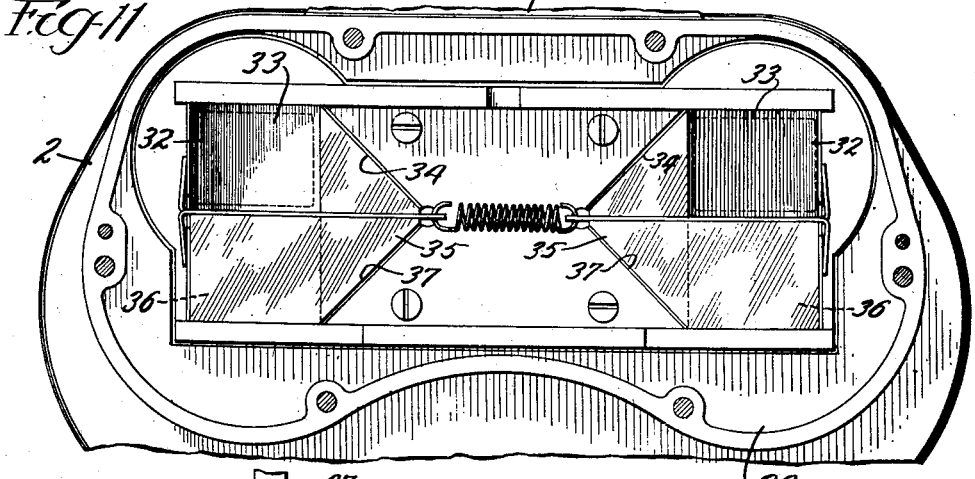
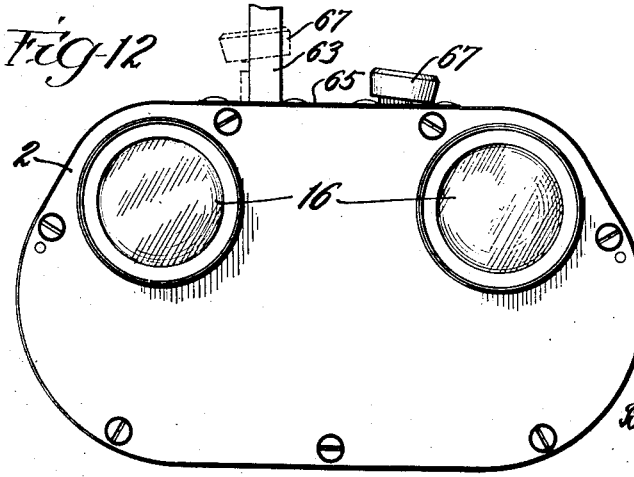

March 3, 1936.  A. WARMISHAM  2,032,676
VIEWING DEVICE
Filed June 17, 1931  9 Sheets-Sheet 9
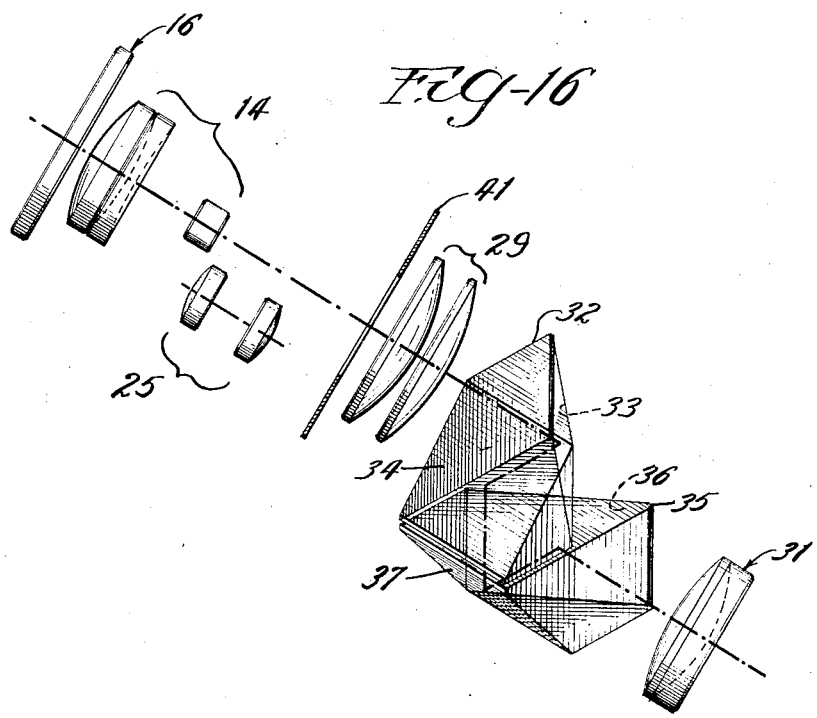
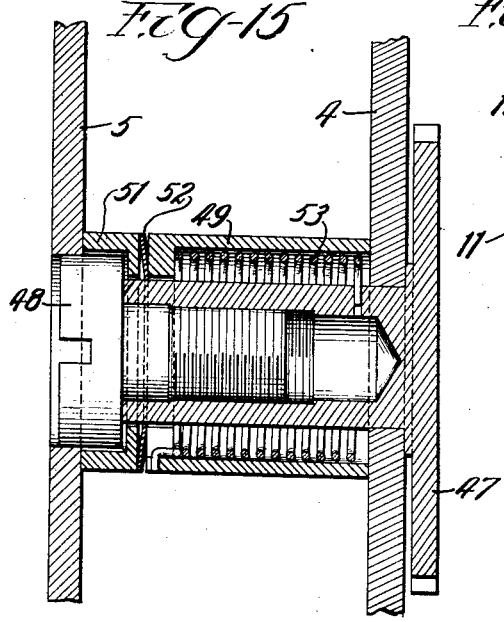
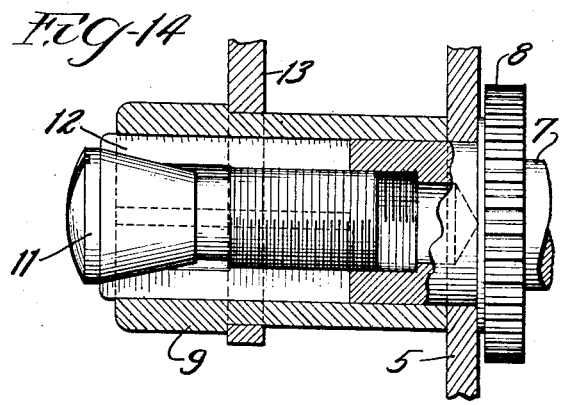
Inventor:-
Arthur Warmisham,
By:- Miehle & Miehle,
Atty's Patented Mar. 3, 1936

2,032,676

UNITED STATES PATENT OFFICE 2,032,676

VIEWING DEVICE

Arthur Warmisham, Evanston, Ill., assignor to The Bell & Howell Company, Chicago, Ill., a corporation of Illinois Application June 17, 1931, Serial No. 544,994

11 Claims. (Cl. 88—34)

My invention relates particularly to viewing devices used in connection with photographic cameras for observing the extent of photographic fields thereof, and has for a principle object the provision of a viewing device which is adapted for use in connection with camera objectives of varying focal lengths to the end that the viewing device affords images corresponding to the photographic fields of camera objectives of widely varying focal lengths, which images are of suitable size for accuracy and convenience in observation.

Another object of my invention resides in the provision of a binocular viewing device in which a scene area is defined by an apparently semi-transparent frame so that what is not included in the defined scene area may be observed together with that which is included therein.

The device, as shown, is in the form of an independent instrument, and, as such, is particularly adapted for use by motion picture directors in observing a given scene to be photographed with a view toward determining the proper photographic lens to be used with reference to focal length and for observing the scene while being photographed.

With the above objects in view my invention consists in certain features of novelty in the construction, combination, and arrangement of parts by which the said objects and certain other objects, hereinafter appearing, are effected, all as fully described with reference to the accompanying drawings and more particularly pointed out in the appended claims.

In the said drawings—

Figure 4 is a sectional view on the line 4—4 of Figure 2;

Figure 5 is a sectional view on the line 5—5 of Figure 2;

Figure 6 is a sectional view on the line 6—6 of Figure 5;

Figure 7 is a sectional view on the line 7—7 of Figure 5;

Figure 9 is a sectional view on the line 9—9 of Figure 5;

Figure 10 is a sectional view on the line 10—10 of Figure 4;

Figure 11 is a sectional view on the line 11—11 of Figure 4;

Figure 12 is a front elevation of the device;

Figure 13 is a partial sectional view on the line 13—13 of Figure 7;

Figure 14 is a partial sectional view on the line 14—14 of Figure 6;

Figure 15 is a partial sectional view on the line 15—15 of Figure 6; and

Figure 16 is a view illustrating an optical system of the device.

Like characters of reference indicate like parts in the several views.

Figure 1:
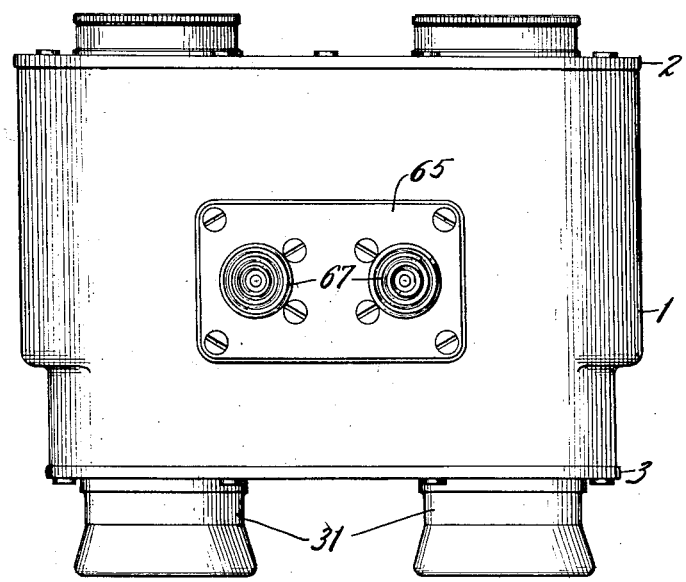
Figure 1 is a top plan view of a viewing device embodying my invention.
Figure 2:
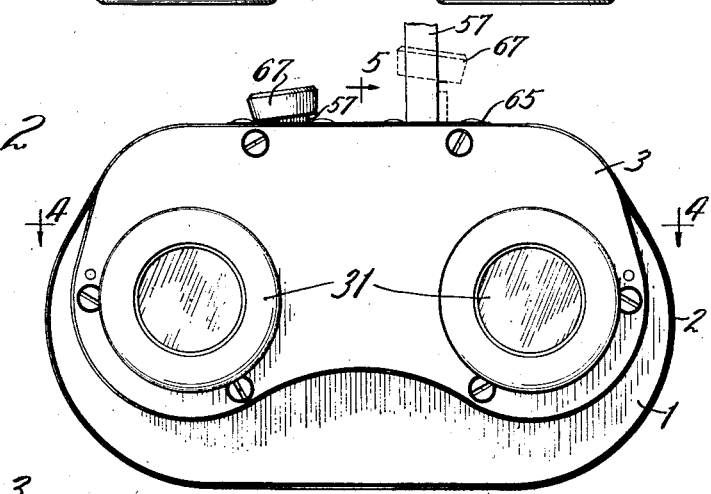
Figure 2 is a rear elevation of the same.
Figure 3:
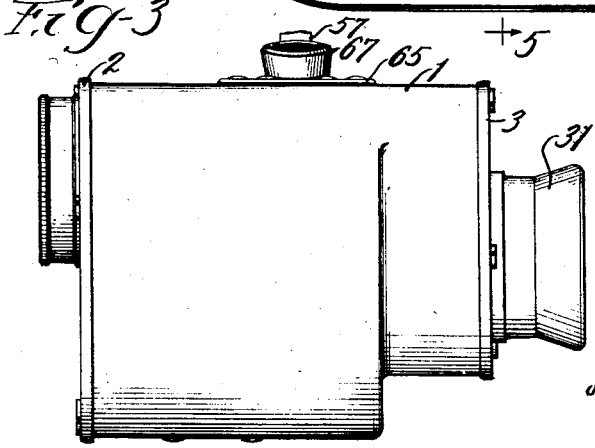
Figure 3 is a side elevation of the same.

Referring to the drawings, 1 designates a casing body to which is attached a front piece 2 and a rear piece 3 to form the casing. See Figures 1, 2, 3 and 12.

The casing is transversely extended in a horizontal plane, and secured therein is a frame including an intermediate transverse vertically disposed plate 4, a second transverse vertically disposed plate 5 spaced forwardly from the plate 4, and a third transverse vertically disposed plate 6 spaced rearwardly from the plate 4. See Figures 4, 5, 6 and 7.

Journaled in bores through the plates 4 and 5 are adjacent parallel shafts 7 which are horizontally spaced transversely and which are disposed intermediately of the casing on forwardly and rearwardly extending axes. See Figures 4, 5, 6 and 14. These shafts are provided with meshing gears 8 of equal size whereby these shafts move correspondingly in opposite directions.

Engaged on the forward ends of the shafts 7 are bushings 9 which are secured in adjusted position on the shafts by means of taper headed screws 11 screw threaded into bores in the front ends of the shafts to expand the forward ends of the shafts, which forward ends are split as designated at 12, against the bushings 9. See Figure 14.

Secured on the bushings 9 are arms 13 which carry, in the bored outer ends thereof, duplicate objective lenses 14 arranged on forwardly and rearwardly extending axes, and, by reason of the gears 8, these objective lenses are simultaneously positioned for functioning in alinement with horizontally spaced apertures 15 in the front piece 2 of the casing, as shown in Figures 4, 5, 6, 7, and 8, or are simultaneously positioned in non-functioning positions below the apertures 15. The apertures 15 are provided with transparencies 16 to protect the interior of the casing.

Extending forwardly and rearwardly through bores in the plates 4, 5, and 6 are two stationary studs 17 which are horizontally spaced transversely of the casing and which are disposed at the ends of the plate 5 adjacent its upper edge which is intermediate the top and bottom of the casing. See Figure 13. The rear portions of these studs passing through the plates 4 and 6 are reduced, and bushings 18 are engaged on the studs between the plates 4 and 6. Headed screws 19 are screw-threaded into the ends of the studs 17 and engage the plates 5 and 6, and these stud structures, together with a similar center stud structure 21 at the bottom of the plates as shown in Figure 5, serve to secure the plates 4, 5 and 6 in spaced relation, the plate 4 being secured to the bottom of the casing, as designated at 22 in Figure 5.

Journaled on the studs 17 between the plates 4 and 5 are bushings 23 to which are secured arms 24 which carry, in the bored outer ends thereof, duplicate objective lenses 25 arranged on forwardly and rearwardly extending axes and which are thus movable into functioning position in alinement with the apertures 15 and out of such position as shown in Figures 4, 5, 6, 7 and 8.

The arms 24 are operatively connected by a bar 26 pivotally connected to each of these arms, as designated at 27, so that the lenses 25 are simultaneously positioned in and out of functioning position. See Figures 4 and 7.

The pairs of objective lenses 14 and 25 are used alternately in their functioning positions alined with the apertures 15, and these pairs differ in focal length for purposes hereinafter described. However, both pairs have the same rear focus and form, when in functioning position, the objectives of a binocular telescope now to be described.

The casing 1 is provided, rearwardly of the plate 6, with a transverse vertically disposed partition 28, in two horizontally spaced apertures of which are mounted duplicate field lenses 29 of the telescopes, which field lenses are alined with the apertures 15, and the objectives 14 and 25 when in functioning position. See Figures 4 and 16.

Mounted in horizontally spaced apertures in the rear piece 3 on forwardly and rearwardly extending axes are duplicate eye lenses 31 of the telescopes, the axes of which eye lenses are offset downwardly from those of the field lenses 29.

Optically interposed between the field lenses 29 and the eye lenses 31 are reflecting devices which serve not only to shorten the instrument but which serve to cause inversion of the images so that the view is seen through the device in upright position, and these reflecting devices will now be described.

Glass reflecting prisms 32 have reflecting surfaces 33 thereof internally facing the field lenses 29 and toward each other, see Figures 4, 11 and 16, and have additional reflecting surfaces 34 thereof internally facing the surfaces 33 and downwardly.

Glass reflecting prisms 35, below the prisms 32, have reflecting surfaces 36 thereof internally facing the eye lenses 31 and toward each other, and have additional reflecting surfaces 37 thereof internally facing the surfaces 36 and upwardly to face the reflecting surfaces 34 of the prisms 32.

Accordingly, light, passing rearwardly through the field lenses 29, is reflected laterally from the reflecting surfaces 33 to the reflecting surfaces 34, thence downwardly to the reflecting surfaces 37, thence laterally to the reflecting surfaces 36, and thence rearwardly through the eye lenses 31, as is shown in Figure 16, it being observed that an image passing through the prisms is inverted.

The eye piece of each telescope comprises the widely separated field and eye lenses 29 and 30, both of which are convergent, the eye lens being compound and substantially achromatic while the field lens comprises two simple convergent elements for the purpose of reducing distortion.

The prisms 32 and 35 are disposed between the partition 28 and the rear piece 3 of the casing and are secured in position in a manner unnecessary to be described.

Assuming either pair of the objective lenses 14 or 25 to be in functioning position, a binocular view is afforded by the device.

Preferably, as shown, both pairs of objective lenses 14 and 25 give minification for purposes of compactness and convenience of design, though it is to be understood that my invention embraces a magnifying system as well.

The shorter focal length objectives 25 afford images of given near scene areas of desirable size for accuracy and convenience in observation while the longer focal length objectives 14 afford images of given far scene areas of desirable or sufficient size also for accuracy and convenience in observation, the objectives 25 providing too small images of far scene areas while the objectives 14 cannot embrace the desired near scene areas embraced by the objectives 25.

The device is designed particularly for viewing the photographic fields of camera objectives of varying focal lengths, each pair of objectives of the device being used for a different range of camera objectives of varying focal lengths, the shorter focus objectives 25 being used for a range of shorter focus camera objectives and the longer focus objectives 14 being used for a range of longer focus camera objectives.

In order that the different objective fields of the different camera objectives be defined by the device and in order that the adjustments of the device to accommodate for the definition of the different scene areas of the different camera objectives be accomplished with convenience and dispatch, the following is provided.

Engaged for rotation on the bushings 18 of the studs 17 are bored gear members 38. See Figures 7 and 13. Engaged on rearwardly extending hubs of and secured with these gears are ratchet wheels 39, mask disks 41 and stop wheels 42, the ratchet wheels being disposed forwardly and the stop wheels being disposed rearwardly of the mask disks.

The stop wheels 42 are provided with peripheral radial stop formations 43, see Figure 9, which are engaged by stop pawls 44 pivotally mounted on the rear plate 6, as designated at 45, springs 46 maintaining the pawls in engagement with the stop wheels. Accordingly, each mask disk 41 is predeterminately positioned angularly when rotated in one direction, as shown at the left in Figure 9.

A pair of transversely spaced gears 47 have spindles thereof extending forwardly through and journaled in bores through the plate 4, and each of these gears meshes with the adjacent gear member 38. See Figures 7, 8 and 15. Referring to Figure 15, headed screws 48 are screwthreaded into the forward ends of the spindles of the gears 47 and have their heads journaled in apertures through the plate 5. Surrounding the spindles of the gears 47 between the plates 4 and 5 are thimbles 49, and surrounding these spindles and the heads of the screws 48 are other thimbles 51 between which and the thimbles 49 and surrounding the spindles of the gears 47 are disposed dished annular springs 52 which press the thimbles 49 and 51 against the plates 4 and 5 to normally prevent rotation of the thimbles, the spindles of the gears 47 and the screws 48 being rotatable with reference thereto.

Helical torsion springs 53 lie within enlarged bore portions of the thimbles 49 and surround the spindles of the gears 47 and have ends thereof secured with the spindles of the gears 47 and have the other ends thereof secured with the thimbles 49, whereby each gear 47 is operated by its spring 53 in one direction and each gear 47 meshing with its gear member 38 causes rotation of its mask disk 42 in the direction to engage the stop formation 43 of its stop wheel 42 with the associated pawl 44 and so position the mask disk into its aforesaid predetermined position, which is its neutral or non-functioning position as hereinafter described.

The rear foci of the pairs of objectives 14 and 25 and the front foci of the eye lenses 31 are disposed in the same plane, and the mask disks 41 are disposed in this plane which is disposed immediately in front of the field lenses 29, and the upper portions of the mask disks extend across the optical axis of the two optical systems. See Figures 4, 5 and 9.

Each disk is provided with a series of view apertures 54 therethrough and equally spaced angularly thereabout and disposed to be centered with the axis of the corresponding optical system in corresponding angular positions of the disk. These apertures range progressively in size and with the exception of the largest aperture, serve to define different predetermined scene areas viewed through the corresponding telescope of the device in the angular positioning of the disk. The view through the largest or neutral aperture of each disk is comparatively unrestricted and when the disk is in position with this aperture centered with the optical axis of the corresponding telescope the disk is functionless as to scene area definition.

The view defining apertures 54 of the right eye disk are proportioned to function with the pair of longer focus lenses 14 in defining different predetermined scene areas, and the view defining apertures 54 of the left eye disk are proportioned to function with the shorter focus lenses 25 in defining different predetermined scene areas.

The device is designed particularly for viewing the photographic fields of photographic objectives of different focal lengths, and as such the right eye disk functions with the pair of longer focus lenses 14 to define the photographic fields of a series of relatively long focus lenses of different focal lengths, while the left eye disk functions with the pair of shorter focus lenses 25 to define the photographic fields of a series of relatively short focus lenses of different focal lengths.

As the device is used as a binocular, while either disk is functioning for scene area definition the other disk is positioned with its largest or neutral aperture centered at the focal axis of its telescope. See Figure 9. Accordingly, the visual fusion of the unrestricted scene viewed by one eye and the restricted scene viewed by the other eye results in the observer seeing the unrestricted scene within a semi-transparent frame defining the restricted scene area which is quite desirable. Viewing only through the telescope in which the scene area is defined results in seeing only the restricted scene area.

The disks 41 bear designations 55 associated with the restricting apertures 54 thereof to identify the photographic objective to which each restricting aperture pertains, and where the device is designed for use in the photographing of sound record bearing motion picture film, wires 56 are strung across the restricting apertures to indicate the portion of the normal scene area cut off by the sound track on the motion picture film.

The mechanism by means of which the lenses 14 and 25 are interchanged and the disks 41 are controlled will now be described.

As before stated the disks 41 are yieldably urged into their neutral or non-functioning positions in which the largest or neutral apertures thereof are centered with the optical axes of their telescopes, as shown at the left in Figure 9.

Slidably mounted for longitudinal movement within the casing are two transversely spaced vertical bars 57 which project upwardly through an opening in the top of the casing body 1. See Figures 4, 5 and 8. The left bar is yieldably urged upwardly by means of a coiled compression spring 58 encircling a vertical rod 59 within the casing and bearing upwardly against a block 61 secured on the left bar 57 and having a bore through which the rod 59 passes. The right bar 57 is yieldably urged upwardly by means of a tension spring 62 having its upper end secured with the casing and its lower end with the right bar 57.

Arranged in transverse slots in the upper portions of the bars 57 are control levers 63 which have their lower ends pivoted on the bars 57 on forwardly and rearwardly extending axes, as designated at 64. A plate 65 is secured on the top of the casing body 1 over the aforesaid opening thereof and is provided with apertures 66 through which the bars 57 and the levers 63 pass. See Figure 8. The upper ends of the levers 63 are provided with heads 67 to be engaged by fingers of the hands of the user while holding the instrument so that the levers 63 and bars 57 may be conveniently manipulated.

Bow springs 68, reacting on the bars 57, urge the levers 63 in their pivotal movement outwardly. The levers 63 are provided with outwardly projecting lateral lugs 69 providing lower downwardly facing and upper upwardly facing shoulder surfaces.

When the levers 63 are manually positioned inwardly against the influence of the springs 68, the lugs 69 will pass through the apertures 66 of the plate 65 and permit full reciprocation of the bars 57. When the levers 63 are positioned outwardly with the lugs 69 above the plate 65, as shown at the right in Figure 8, limited reciprocation of the bars 57 is permitted in the upper portion of their movement. As shown at the right in Figure 8, the right bar 57 is shown at the lower end of the said upper portion of its movement as though it were depressed by a finger of the user, the springs 58 and 62 normally operating the bars to their upper positions.

When the levers 63 are positioned outwardly with the lugs 69 below the plate 65, as shown at the left in Figure 8, the bars 57 are locked at the lower ends of their movement.

In order that only one bar 57 may be released from its lower position at a time, a transversely disposed rod 71 is mounted for longitudinal sliding movement immediately below the plate 65 between the bars 57 and in the plane of the levers 63. The length of the rod 71 is such that when one bar 57 is in an upper position the rod is positioned by this bar with an end of the rod projecting into the fully slotted upper portion of the other bar 57 and engaging the lever 63 of this other bar to prevent inward movement of this lever to disengage the lug 69 of this lever from under the plate 65.

When both bars 57 are positioned in their lower positions inward movement of either lever 63 operates the rod 71 against the other lever 63 to prevent releasing movement of this other lever 63, thus releasing only one bar 57 at a time for movement upwardly out of its lower position.

Arranged in transverse slots in the lower portions of the bars 57 are pawls 72 which have their lower ends pivoted on the lower ends of the bars 57 on forwardly and rearwardly extending axes, as designated at 73. See Figure 8. These pawls lie in the plane of the ratchet wheels 39 for engagement therewith, and springs 74 mounted on the bars 57 yieldably urge the pawls 72 outwardly to engage the ratchet wheels.

Detent pawls 75 are pivotally mounted on the opposite ends of the plate 4 on forwardly and rearwardly extending axes, as designated at 76, and, disposed in the plane of the ratchet wheels 39, are yieldably urged into engagement therewith by means of torsion springs 77 associated with the pivots 76.

Figure 8:
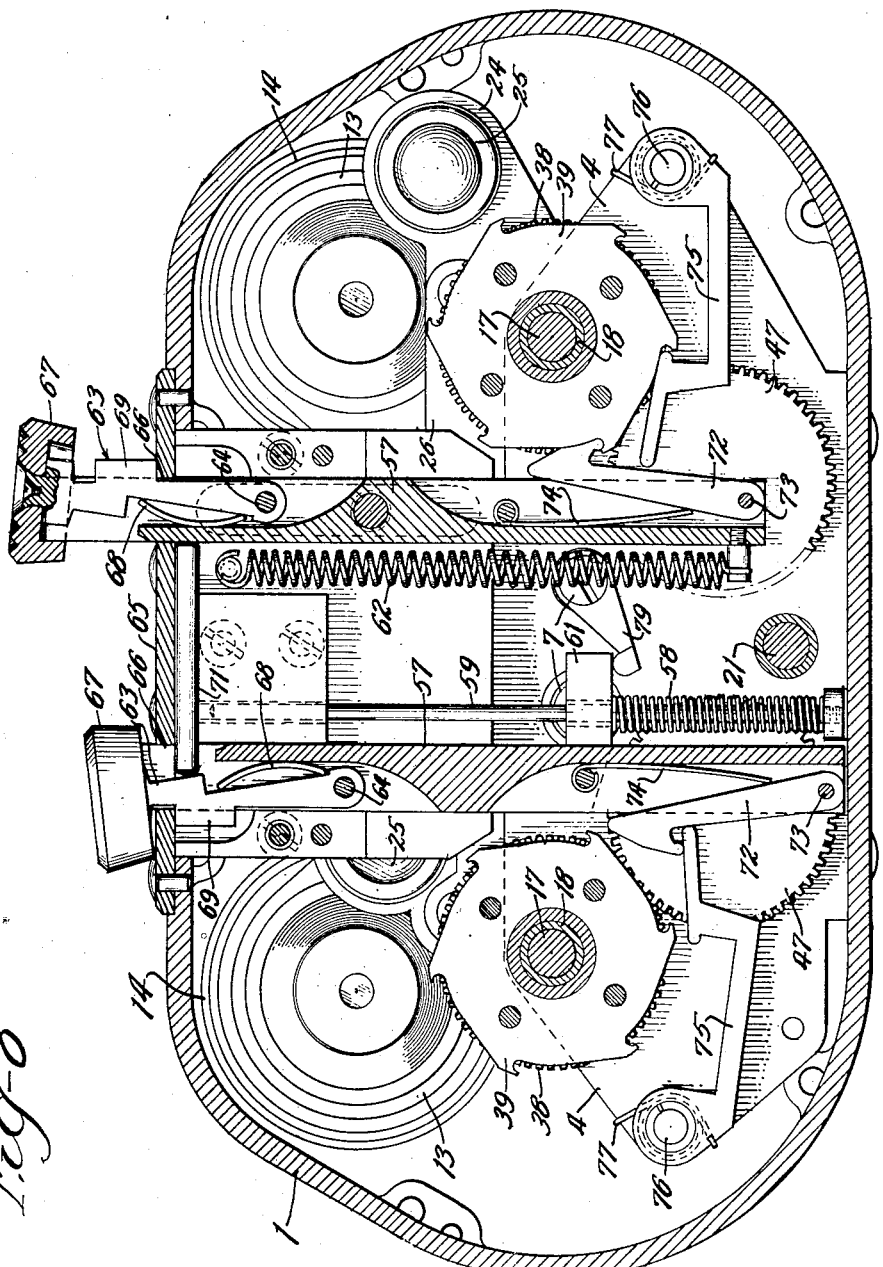
Figure 8 is a sectional view on the line 8—8 of Figure 5.

Release of a bar 57 out of its lower position, as shown at the right in Figure 8, permits reciprocation of the bar in the upper portion of its movement, the lug 69 of the corresponding lever 63 limiting downward movement of the bar in the upper portion of its movement. As a bar 57 is moved downwardly in the upper portion of its movement, the corresponding pawl 72 engages a tooth of the corresponding ratchet wheel 39 and moves the ratchet wheel against its spring 53. As the bar 57 reaches the lower end of the upper portion of its movement the corresponding detent pawl 75 engages a tooth of the ratchet wheel and retains it in its advanced position.

Continued reciprocation of a bar 57 in the upper portion of its movement, accordingly, progressively advances the corresponding ratchet wheel. The teeth of the ratchet wheels 39 are the same in number as the view apertures 54 of the disks 41, and are so positioned with reference thereto that, at each position of a disk 41, as determined by the corresponding detent pawl 75 engaging a tooth of the corresponding ratchet wheel 39, one of the viewing apertures is centered with the focal axis of its telescope.

Consequently, the view apertures 54 of the disks 41 may be selectively brought into functioning position.

As a bar 57 is brought into its lower position, its pawl 72 cams out of engagement with the engaged tooth of the corresponding ratchet wheel 39 and bears downwardly on the inner or free end of the corresponding detent pawl 75 and disengages the detent pawl from the ratchet wheel, as shown at the left in Figure 8, whereupon the ratchet wheel and its disk are rotated in the direction opposite the advancing direction thereof by the corresponding spring 53 until the corresponding stop pawl 44 engages the stop formation 43 of the corresponding stop wheel 42 and thus positions the corresponding disk 41 in nonfunctioning or neutral position with the largest or neutral view aperture centered with the focal axis of the corresponding telescope.

As before stated the disks 41 are used alternately for variably defining scene areas, each disk being used in connection with a respective pair of the objective lenses 14 and 25. In order that the proper pair of objectives functions with the proper disk, the following is provided.

An arm 79 is secured with one of the shafts 7 and has its free end underlying the block 61, so that when the left bar 57 is moved to its lower position the free end of the arm 79 is depressed and the longer focus lenses 14 are moved into functioning position, as shown in Figure 8, in which position the lenses 14 remain while the left bar 57 is in its lower position.

A tension spring 81 has one end secured with an arm 82 on one of the shafts 7 and has its other end secured with the frame, see Figures 4 and 7, for movement of the lenses 14 into nonfunctioning position when the left bar 57 is moved upwardly from its lower position.

A segment 83 is rotatably mounted on the plate 4 at an intermediate upwardly disposed position and on a forwardly and rearwardly extending axis, see Figures 4, 5 and 7, and is provided with a radial slot 84 in which a stud 85, secured on the intermediate portion of the bar 26, is engaged for movement. A forwardly projecting stud 86 on the right bar 57 engages downwardly on a radial surface of the segment 83, so that when the right bar 57 is moved to its lower position, the stud 86 angularly moves the segment 83 which, through the engagement of the stud 85 in the slot 84, effects movement of the bar 26, to the left in Figure 7, to position the shorter focus lenses 25 in functioning position.

A tension spring 87 has one end thereof connected with one of the arms 24, as designated at 88, and has the other end thereof connected with the frame, see Figures 4 and 7, for movement of the lenses 25 into non-functioning position when the right bar 57 is moved upwardly from its lower position.

Accordingly, the functioning of the longer and shorter focus objectives 14 and 25 with the respective mask disks 41 is insured in a convenient manner, the device being quite compact and being well adapted for motion picture directors in choosing the photographic objective best adapted for a given scene as well as observing a scene while being photographed.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a viewing device the combination with two alternately functioning pairs of binocular objectives, one pair differing in focal length from the other, and view limiting means for rendering the field of view through one of each of said pairs of objectives less than that through the other.

2. In a telescopic viewing device the combination with two alternately functioning pairs of binocular objectives, one pair differing in focal length from the other, of adjustable view limiting means for defining selectively different predetermined scene areas viewed through one of each of said pairs of objectives less than those viewed through the other.

3. In a viewing device the combination with two alternately functioning pairs of binocular objectives, one pair differing in focal length from the other, of adjustable view limiting means for defining selectively different predetermined scene areas viewed through one of each of said pairs of objectives less than those viewed through the other, the scene areas defined by said view limiting means through an objective of one of said pairs corresponding with the fields covered by one group of photographic objectives differing in focal length and the scene areas defined by said view limiting means through an objective of the other of said pairs corresponding with the fields covered by a different group of photographic objectives differing in focal length.

4. In a viewing device the combination with two pairs of binocular objectives, one pair differing in focal length from the other, of means whereby said pairs are selectively brought into functioning position, and two adjustable view limiting devices, one for the right objective of one pair and the other for the left objective of the other pair, each view limiting device being adapted to define selectively a group of predetermined scene areas viewed through the corresponding objective and each adapted to be rendered inoperative.

5. In a viewing device the combination with two pairs of binocular objectives, one pair differing in focal length from the other, of means whereby said pairs are selectively brought into functioning position, two adjustable view limiting devices, one for an objective of one pair and the other for an objective of the other pair, each view limiting device being adapted to define selectively a different group of predetermined scene areas viewed through the corresponding objective and each adapted to be rendered inoperative, and means for automatically rendering each limiting device inoperative while the corresponding pair of objectives is out of functioning position.

6. In a viewing device the combination with two pairs of binocular objectives, one pair differing in focal length from the other, of two adjustable view limiting devices, one for an objective of one pair and the other for an objective of the other pair, each view limiting device being adapted to define selectively a different group of predetermined scene areas viewed through the corresponding objective and each adapted to be rendered inoperative, a pair of manually controlled devices, means whereby said pairs of objectives are individually under the control of said manually controlled devices for selectively bringing said pairs of objectives into functioning position, and means whereby said limiting devices are individually under the control of said manually controlled devices for selectively adjusting and rendering the same inoperative, each limiting device being inoperative when the corresponding pair of objectives is out of functioning position.

7. In a viewing device the combination with two pairs of binocular objectives, one pair differing in focal length from the other, of two adjustable view limiting devices, one for an objective of one pair and the other for an objective of the other pair, each view limiting device being adapted to define selectively a different group of predetermined scene areas through the corresponding objective and adapted to be rendered inoperative, a pair of manually controlled devices, means whereby said pairs of objectives are individually under the control of said manually controlled devices for selectively bringing said pair of objectives into functioning position, means whereby said limiting devices are individually under the control of said manually controlled devices for selectively adjusting and rendering the same inoperative, each limiting device being inoperative when the corresponding pair of objectives is out of functioning position, and automatic interlock means necessitating selective operation of said manually controlled devices to bring said pairs of objectives into functioning position and to render said limiting devices operative and to adjust the same.

8. In a viewing device the combination with an adjustable view limiting device yieldably urged to one end of its adjustment, of a manually controlled reciprocable member, ratchet means for progressively operating said limiting device to the other end of its adjustment with reciprocation of said reciprocable member including a releasable detent pawl, means whereby an extended movement of said reciprocable member beyond an end of said reciprocation thereof releases said detent pawl, and releasable means preventing said extended movement of said reciprocable member.

9. In a viewing device the combination with an adjustable view limiting device yieldably urged to one end of its adjustment, of a manually controlled reciprocable member yieldably urged in one direction and manually actuated in the other, ratchet means for progressively operating said limiting device to the other end of its adjustment with reciprocation of said reciprocable member including a releasable detent pawl, means whereby extended movement of said reciprocable member beyond the end of said reciprocation in the direction of manual actuation thereof releases said detent pawl, and means preventing said extending movement of said reciprocable member comprising a locking member mounted on said reciprocable member and yieldably urged into locking position and manually actuated out of locking position.

10. In a telescope the combination with spaced eye and objective lenses giving minification, of a field lens disposed therebetween and comprising separate simple convergent elements and so disposed that the light path between the field and eye lenses is longer than the light path between the field and objective lenses.

11. In a telescope the combination with spaced eye and objective lenses giving minification and the eye lens comprising a compound substantially achromatic lens, of a field lens disposed therebetween and comprising two adjacently spaced simple convergent elements and so disposed that the light path between the field and eye lenses is longer than the light path between the field and objective lenses.

ARTHUR WARMISHAM.